United States Patent
Santangelo et al.

(10) Patent No.: US 11,073,467 B2
(45) Date of Patent: Jul. 27, 2021

(54) MINIATURIZED OPTICAL PARTICLE DETECTOR

(71) Applicant: STMICROELECTRONICS S.R.L., Agrate Brianza (IT)

(72) Inventors: Antonello Santangelo, Belpasso (IT); Salvatore Cascino, Gravina di Catania (IT); Viviana Cerantonio, Acireale (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 21 days.

(21) Appl. No.: 16/586,627

(22) Filed: Sep. 27, 2019

(65) Prior Publication Data

US 2020/0103334 A1 Apr. 2, 2020

(30) Foreign Application Priority Data

Sep. 28, 2018 (IT) .................. 102018000009036

(51) Int. Cl.
*G01N 15/14* (2006.01)
*G01N 15/00* (2006.01)

(52) U.S. Cl.
CPC . *G01N 15/1436* (2013.01); *G01N 2015/0046* (2013.01); *G01N 2015/1493* (2013.01)

(58) Field of Classification Search
CPC ....... G01N 15/1436; G01N 2015/0046; G01N 2015/1493; G01N 21/3504; G01N 15/06; G01N 21/15; G01N 21/17; G01N 21/0303
USPC ......................... 356/338, 440, 437
See application file for complete search history.

(56) References Cited

U.S. PATENT DOCUMENTS

| 4,422,761 | A | | 12/1983 | Frommer | |
|---|---|---|---|---|---|
| 5,170,064 | A | * | 12/1992 | Howe | G01N 21/3504 250/228 |
| 5,451,931 | A | * | 9/1995 | Muller | G08B 17/107 250/573 |

(Continued)

FOREIGN PATENT DOCUMENTS

| CN | 109960024 A | * | 7/2019 | ......... G02B 19/0023 |
|---|---|---|---|---|
| EP | 0896216 A2 | | 2/1999 | |

(Continued)

OTHER PUBLICATIONS

Allen, "De-construction of the Shinyei PPD42NS dust sensor," version 0.2, EME systems, 2013, 4 pages.

(Continued)

*Primary Examiner* — Isiaka O Akanbi
(74) *Attorney, Agent, or Firm* — Seed IP Law Group LLP

(57) ABSTRACT

A particle detector formed by a body defining a chamber and housing a light source and a photodetector. A reflecting surface is formed by a first reflecting region and a second reflecting region that have a respective curved shape. The curved shapes are chosen from among portions of ellipsoidal, paraboloidal, and spherical surfaces. The first reflecting region faces the light source and the second reflecting region faces the photodetector. The first reflecting region has an own first focus, and the second reflecting region has an own first focus. The first focus of the first reflecting region is arranged in an active volume of the body, designed for detecting particles, and the photodetector is arranged on the first focus of the second reflecting region.

21 Claims, 6 Drawing Sheets

(56) References Cited

U.S. PATENT DOCUMENTS

| | | | | |
|---|---|---|---|---|
| 5,973,326 | A | * | 10/1999 | Parry .................. G01N 21/031 |
| | | | | 250/343 |
| 6,067,840 | A | | 5/2000 | Chelvayohan et al. |
| 7,449,694 | B2 | | 11/2008 | Yi et al. |
| 7,796,265 | B2 | | 9/2010 | Tkachuk |
| 7,880,886 | B2 | | 2/2011 | Ludwig |
| 8,003,945 | B1 | | 8/2011 | Wong |
| 8,158,946 | B2 | * | 4/2012 | Wong .................... G01J 5/0818 |
| | | | | 250/343 |
| 8,415,626 | B1 | | 4/2013 | Wong |
| 9,134,224 | B2 | | 9/2015 | Matsushima et al. |
| 9,239,291 | B2 | | 1/2016 | Sakamoto |
| 9,804,084 | B2 | | 10/2017 | Kouznetsov et al. |
| 2005/0017206 | A1 | * | 1/2005 | Tice .................. G01N 15/06 |
| | | | | 250/573 |
| 2007/0114421 | A1 | * | 5/2007 | Maehlich ........... G01N 21/3504 |
| | | | | 250/343 |
| 2009/0235720 | A1 | | 9/2009 | Smith |
| 2010/0309013 | A1 | | 12/2010 | Liess et al. |
| 2015/0377775 | A1 | | 12/2015 | Sakai et al. |
| 2016/0231244 | A1 | * | 8/2016 | Camargo ............... G01N 21/61 |
| 2017/0184447 | A1 | | 6/2017 | Matsunami et al. |
| 2018/0348121 | A1 | * | 12/2018 | Deliwala ................ G01N 21/01 |
| 2019/0195778 | A1 | * | 6/2019 | Lee .................... G02B 19/0085 |
| 2020/0103339 | A1 | | 4/2020 | Castagna et al. |

FOREIGN PATENT DOCUMENTS

| | | |
|---|---|---|
| EP | 2772749 A1 | 9/2014 |
| JP | 9-229858 A | 9/1997 |
| WO | 2005/062024 A1 | 7/2005 |
| WO | 2007/091043 A1 | 8/2007 |

OTHER PUBLICATIONS

Coating Suisse, "IR-Reject coating Solution for film (Thermal and UV curing)," product data sheet, downloaded from https://www.coating-suisse.com/wp-content/uploads/2016/02/CS-IR-CUT_-Coating-agent-solution-001CS.pdf on Sep. 27, 2019, 16 pages.

Epolin, Inc., "NIR Absorbing Coatings," product data sheet, downloaded from https://www.epolin.com/nir-absorbing-coatings on Sep. 27, 2019, 2 pages.

Fujifilm, "Infrared Absorber Range," product data sheet, downloaded from www.fujifilmusa.com/shared/bin/IGN330_FUJIFILM_INFRARED_ABS_US%20LETTER_LEAFLET AW.pdf on Sep. 27, 2019, 2 pages.

Jung (ed.), Op Amp Applications Handbook, Newnes, Burlington Massachusetts, 2005, 103 pages.

Kuula et al., "Response Characterization of an Inexpensive Aerosol Sensor," *Sensors 17*: 2017, 14 pages.

Lewotsky, "Integrated microlenses reshape VCSEL beams," published online Jul. 1, 1995, downloaded from https://www.laserfocusworld.com/lasers-sources/article/16553585/integrated-microlenses-reshapevcsel-beams on Sep. 30, 2019, 6 pages.

Shao et al., "Fine Particle Sensor Based on Multi-Angle Light Scattering and Data Fusion," *Sensors 17*:2017, 15 pages.

Sharp, "Application note of Sharp dust sensor GP2Y1010AU0F," GP2Y1010AU0F, Sheet No. OP13024EN, 2013, 7 pages.

Spring et al., "Introduction to Mirrors," downloaded from https://www.olympus-lifescience.com/en/microscope-resource/primer/lightandcolor/mirrorsintro/ on Sep. 27, 2019, 8 pages.

Texas Instruments, "TI Designs $PM_{2.5}/PM_{10}$ Particle Sensor Analog Front-End for Air Quality Monitoring Design," Technical Data Sheet, Dec. 2015, Revised May 2016, 44 Pages.

Tribastone et al., "An Introduction to the Design, Manufacture and Application of Plastic Optics," downloaded from http://www.apollooptical.com/content/docs/photonics_article.pdf on Sep. 27, 2019, 10 pages.

United States Environmental Protection Agency, "AQI Breakpoints," published online on Sep. 27, 2019, downloaded from https://aqs.epa.gov/aqsweb/documents/codetables/aqi_breakpoints.html on Sep. 27, 2019, 6 pages.

Wang et al., "Laboratory Evaluation and Calibration of Three Low-Cost Particle Sensors for Particulate Matter Measurement," *Aerosol Science and Technology* 49:1063-1077, 2015.

Lee et al., "A monolithically integrated plasmonic infrared quantum dot camera," Nature Communications 2(286): 2011, 6 pages.

Chen et al., "A CMOS Image Sensor Integrated with Plasmonic Colour Filters," Plasmonics 7:695-699, 2012.

Källhammer et al., "Fulfilling the pedestrian protection directive using a long-wavelength infrared camera designed to meet both performance and cost targets," Proc. of SPIE (6198): 2006, 11 pages.

OMRON Corporation, "OMRON Develops the World's First* 16x16 Element MEMS Non-Contact Thermal Sensor for Use in Human Presence Sensors Utilizing Wafer-Level Vacuum Packaging Technology," press release, published online on May 29, 2013, downloaded from https://www.omron.com/media/press/2013/05/e0529.html, 3 pages.

Rogalski, Infrared Detectors, Second Edition, 2011, CRC Press, Boca Raton, Florida, front matter and table of contents, 24 pages.

Frodl et al., "A High-Precision NDIR CO2 Gas Sensor for Automotive Applications," IEEE Sensors Journal 6(6):1697-1705, 2006.

Han et al., "High Detection Performance of NDIR CO2 Sensor Using Stair-Tapered Reflector," IEEE Sensors Journal 13(8):3090-3097, 2013.

Mayrwöger et al., "Modeling of Infrared Gas Sensors Using a Ray Tracing Approach," IEEE Sensors Journal 10(11):1691-1698, 2010.

CO2Meter.com, "COZIRTM Ultra Low Power Carbon Dioxide Sensor," product data sheet, 2016, 3 pages.

SenseAir, "Senseair K30 Sensor and OEM Platform," product specification, 2019, 8 pages.

SenseAir, "Senseair S8 5% Miniature infrared CO2 sensor," product specification, 2019, 8 pages.

Figaro Engineering Inc., "Non-Dispersive Infra-Red (NDIR) CO2 Sensor," downloaded from https://www.figaro.co.jp/en/product/feature/cdm7160.html on Sep. 5, 2019, 6 pages.

* cited by examiner

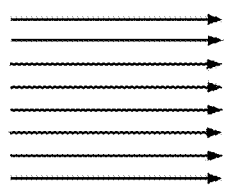
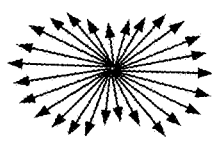
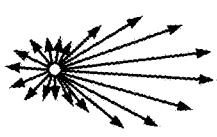
Fig.1A   Fig.1B   Fig.1C
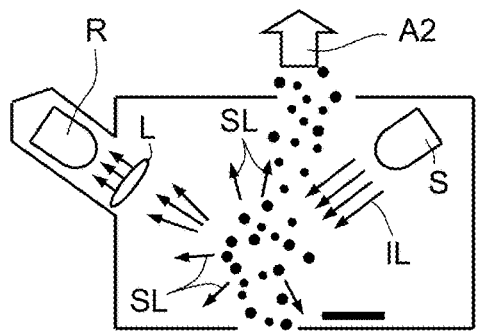
Fig.2
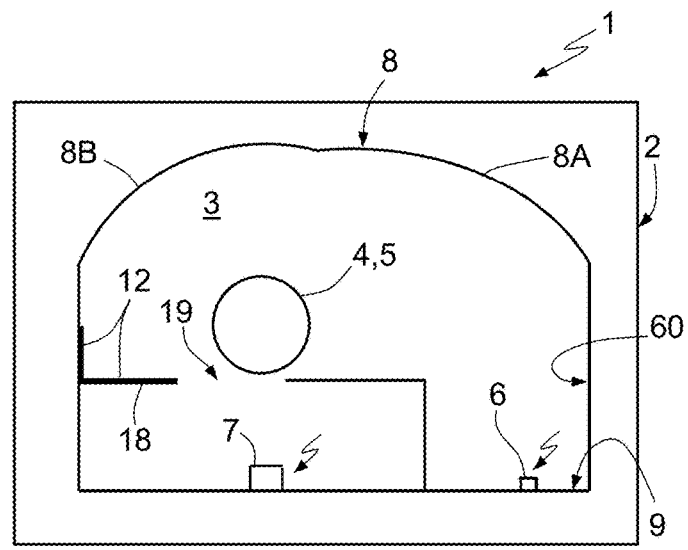
Fig.3
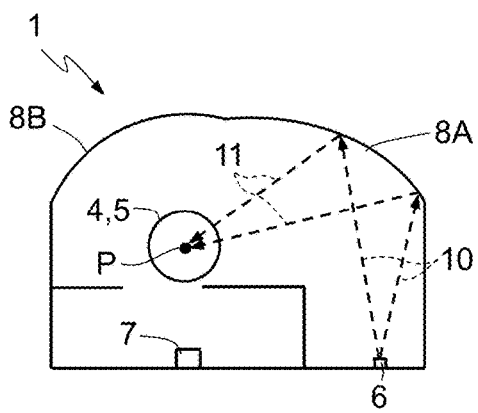
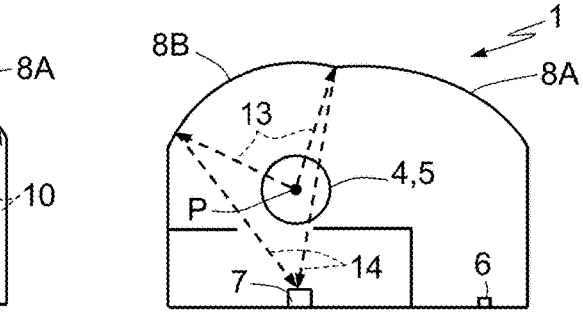
Fig.4A   Fig.4B

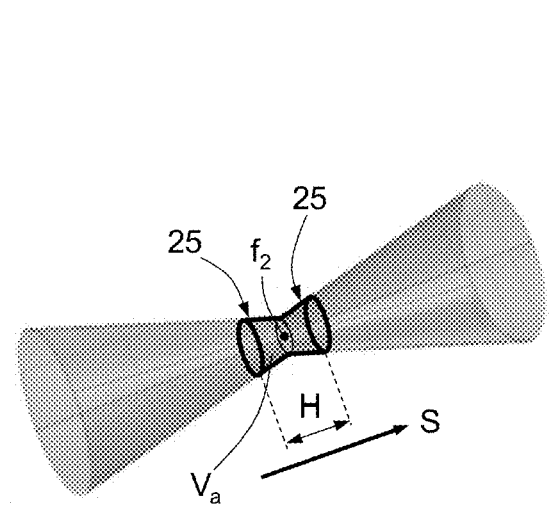 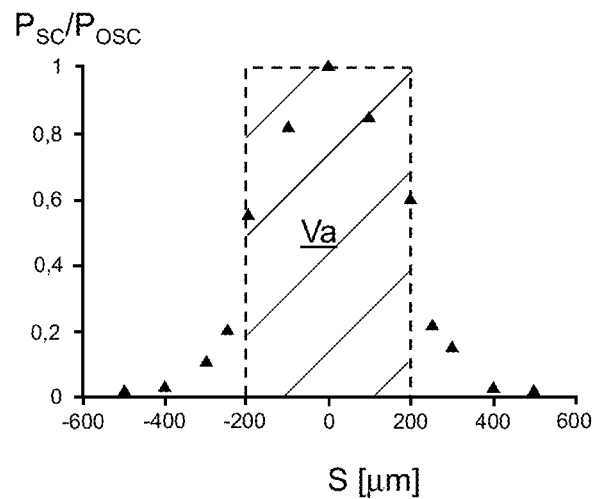
Fig. 7A    Fig. 7B
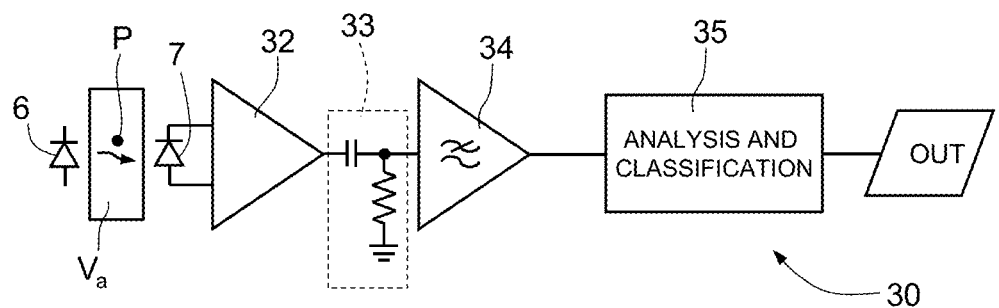
Fig. 8A
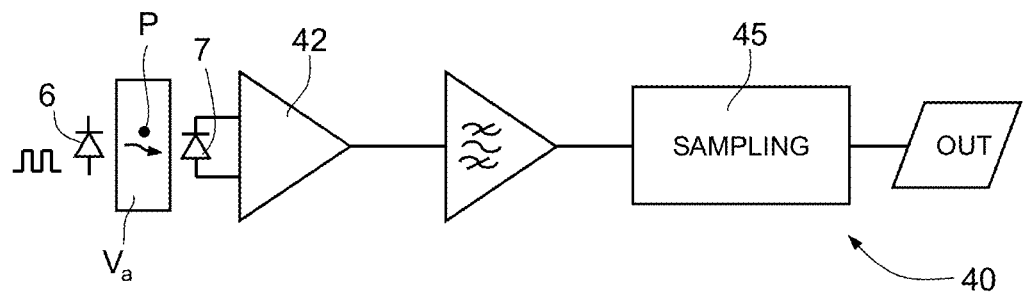
Fig. 8B

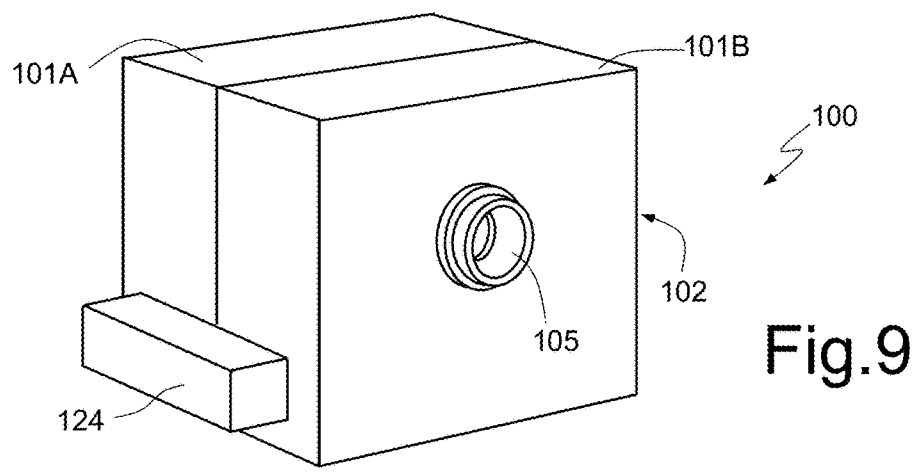
Fig.9
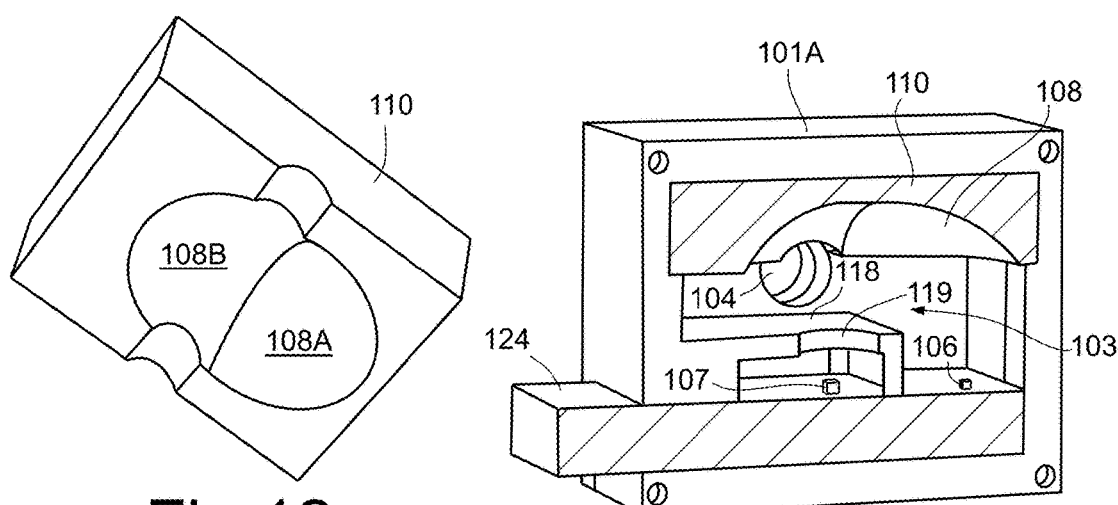
Fig.12
Fig.10
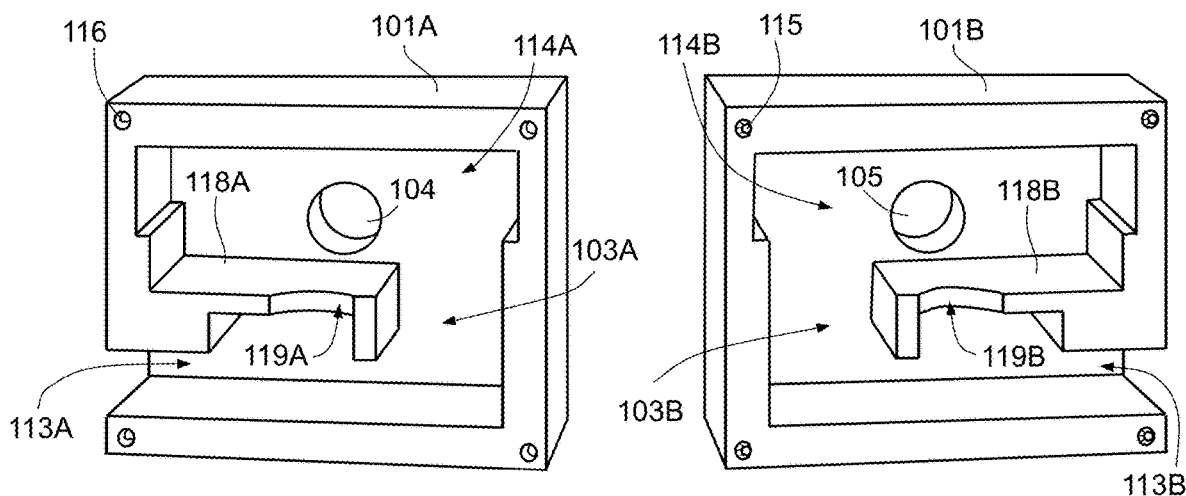
Fig.11A
Fig.11B

MINIATURIZED OPTICAL PARTICLE DETECTOR

BACKGROUND

Technical Field

The present disclosure relates to a miniaturized optical particle detector. In particular, hereinafter reference will be made to detection of environmental pollution particles, i.e., particulate matter.

Description of the Related Art

As is known, particulate matter is one of the pollutants that have the greatest impact in urban areas and may be a serious danger for human health. It comprises solid and liquid particles with a variable aerodynamic diameter, typically ranging from tens of nanometers to hundreds of micrometers. Generally, the particles are divided into three categories on the basis of their aerodynamic diameter:

ultrafine particles: they have an aerodynamic diameter comprised between 0.01 and 0.1 µm;

fine particles: they have an aerodynamic diameter comprised between 0.1 and 2.5 µm; and coarse particles: they have an aerodynamic diameter comprised between 2.5 and 100 µm.

To identify the dimensions of particulate matter, the acronym PM is used followed by the maximum aerodynamic diameter of the particles.

Thus, fine and ultrafine particles are catalogued as PM2.5 and represent particulate matter with a diameter of less than 2.5 µm. They form a thoracic dust, i.e., are able to deeply penetrate into the lungs, especially when breathing through the mouth, but can also penetrate into the blood stream, precisely like oxygen. These particles may be formed by various chemical components, among which some heavy metals such as arsenic, cadmium, mercury, and nickel. The carbon fraction (carbon black) forms one of the main components of fine particulate matter.

The portion of coarse particles that have an aerodynamic diameter comprised between 2.5 µm and 10 µm is also an inhalable dust, but is able to penetrate only in the upper respiratory tract (nose and larynx). These particles form, together with particles smaller than 2.5 µm, the particulate matter referred to as PM10.

Particles due to combustion, organic and metallic components, etc., fall within the PM2.5 category, whereas dust, pollen, molds, etc., fall within the wider PM10 category.

Other particles, such as ozone, nitrogen oxides, and volatile organic compounds react with each other to produce other pollutants that form the so-called photochemical smog. Even more than the gaseous component, suspended atmospheric dusts assume a complex chemical composition, which comprises thousands of primary and secondary pollutants and depends upon the nature of the sources. These species also have concentrations and chemical, physical, and biological properties that are extremely different from each other.

Since atmospheric pollution is an important risk factor for human health, it is necessary to quantify the air quality level. To this end, an index (IQA, Index of Quality of the Air) has been defined that supplies in a single datum the overall state that takes into account criteria linked to the danger of components (see, for example, the table "US EPA's Table of Breakpoints", published by the U.S. Environment Protection Agency).

Various methods exist for measuring atmospheric particulate, amongst which: the gravimetric method, and methods that use TEOMs (Tapered-Element Oscillating Microbalances), SMPSs (Scanning Mobility Particle Sizers), ß-radiation absorption analyzers, and optical analyzers. In the framework of developing particulate sensors, particular attention is directed at sensors implementing optical methods, since they can be manufactured at low costs and with dimensions in the region of a few centimeters.

Optical analyzers exploit the interaction between the particles dispersed in the air and visible or infrared light as method for measuring PM in the environment. If appropriately designed, sensors of an optical type are able to count the particles within a flow of air and classify them on the basis of their size. An optical method for detecting particulate uses, for example, light scattering: the presence of particles is detected by measuring the light scattered in various directions by the particles when impinged upon by light radiation.

Various theories are underlying detection of particles via light scattering and may be applied each time according to the ratio between the size of the particle and the used light wavelength. If the equivalent optical diameter d of the particle is smaller than the wavelength $\lambda$ of the incident light, the light is scattered prevalently in the direction of the light beam and in the opposite direction, almost in a symmetrical way, as shown in FIG. 1A (Rayleigh scattering). When the dimension d of the particle is comparable or greater than the wavelength $\lambda$ of the incident light, the light is deviated slightly and just around the initial direction (FIGS. 1B and 1C, corresponding to progressively increasing equivalent optical diameter d, Mie scattering).

Obviously, this is a conceptual schematization since the particles have an extremely variable chemico-physical nature, a geometrical shape very far from the classic sphere, and markedly variable optical parameters and densities.

It is thus preferred to experimentally find the optimal angle for observing the scattered radiation, considering also that it is difficult to make a measure in the same direction as the incident beam because the detector would be dazzled. In the paper by Wenjia Shao, Hongjian Zhang and Hongliang Zhou, "Fine Particle Sensor Based on Multi-Angle Light Scattering and Data Fusion"—Sensors (Basel), 2017, May 4; 17(5), pii: E1033. doi: 10.3390/s17051033, the authors show quite a good agreement on the particulate matter PM2.5 by appropriately positioning the photodetectors and show that, at wide angles of 140°, the signal is weak and angles of between 40° and 55° with respect to the light direction are to be preferred.

It is on the other hand useful to have efficient particulate sensors, since they can be used in various contexts, such as in the passenger compartment of vehicles, in dwellings, for ventilation systems, in an open environment for monitoring air during walking or running, in presence of wood stoves, in environments for smokers, inside factories, etc.

In all these cases, it is desirable that these sensors are simple to manufacture and miniaturizable so as to enable their integration in different portable apparatuses.

Moreover, it is desirable for the detectors using optical principles, such as the light scattering described previously, to be able to block the light coming from outside and prevent the internal source from illuminating the detector, directly or indirectly through the walls. The detector in fact has the purpose of collecting the weak light coming from the particles, without being dazzled by any parasitic light.

An aim of these detectors is to enable determination of the concentration of the particles per unit volume. However, frequently this parameter is not sufficient. In fact, the size of the particles also plays a fundamental role, in view of the danger to human health of the smaller particles, and thus actually it is useful to know the concentration for a given range of sizes. For detectors operating according to the optical principle, the presumed size of the particle is empirically extracted from the intensity of the scattered light, and the count of the pulses leads, instead, to an estimate of the concentration, knowing the volume within which the count is made and the flow rate of the air traversing it (this being the method underlying operation of SPCs, Single-Particle Counters).

It is preferable for the count volume to be as small as possible so that the likelihood of two simultaneous particles is low. Moreover, it is useful for the intensity of the exploring light to be maximized so as to increase the part scattered by the particle and impinging upon the detector and thus discriminate ever smaller particles.

Therefore, the size of the analysis volume poses an upper limit to the maximum concentration to the operation of the instrument.

In many solutions proposed in the literature, the requisite of small detection (focusing) volumes and the attempt to increase the light-collection angle (collection efficiency) lead to using optical lenses. However, use of the latter, together with the angled arrangement between the direction of the light incident on the particle and of the scattered light, pose limitations on the possibility of miniaturizing these sensors, as discussed hereinafter.

Other optical sensors that are once again based upon the same detection principles but perform a sampling on larger volumes (photometric method) are not suited to classifying the dimensions of the particles, but may be calibrated for concentration on a typical distribution of particles that is not always correct.

Particulate sensors, like other types of instruments, may be divided into two major categories: laboratory instruments, and small-sized sensors.

Laboratory instruments may be based upon different operating principles. They are in general more precise, but cumbersome, heavy, and costly (more than $20,000 USD). Frequently, a cabinet is required to properly position them and they have appropriate tubing enabling sampling of the external air (in the case of environmental particulate).

Small apparatuses are, instead, relatively portable, have a low cost (generally less than $40 USD) and can be easily accommodated in a domestic environment or inside a motor vehicle. In general, they are based upon light scattering and are typically made up of a light source (for example, an infrared LED or a laser), a photodetector, and focusing lenses. FIG. 2 shows, for example, the structure of a known SPC (Single-Particle Counter), manufactured by Shinyei. In this apparatus, particles to be measured enter the device in the direction of the arrow A1 and exit in the direction of the arrow A2. A light source S, here formed by an infrared LED, and a photodetector R are arranged so that the direction of the incident light IL emitted by the light source S forms an angle of approximately 60° with respect to the direction of the scattered light SL detected by the photodetector R. A lens L, appropriately positioned above the photodetector R, focuses part of the scattered light SL towards the photodetector R. The lens L has the purpose of reducing the detection volume to be sampled and simultaneously allows an increase in the collection angle of the scattered light. In this apparatus, the particular arrangement of the optical components and the presence of the lens L sets limits on any further miniaturization of the apparatus.

Other apparatuses allow measuring higher concentration values. For instance, the apparatus GP2Y1010 manufactured by Sharp Corporation, which falls within the field of photometric sensors, has a lens and a slit positioned in front of a photodetector so as to minimize the effect of the parasitic light within the sensor and to enable efficient concentration of the scattered light (when the particles are present). It follows that, also here, the source and the detector lie in different planes that form between them the optimal angle referred to above.

Thus, also in this case the spatial arrangement of the optical components does not enable any further miniaturization of the sensor.

BRIEF SUMMARY

At least one embodiment of the present disclosure provides a particle detector that overcomes one or more of the drawbacks of the prior art.

According to the present disclosure, an optical particle detector is provided.

In practice, in the present detector, the photodetector and the optical source are set in a same plane or in planes parallel to each other, and the correct angle between the direction of the light emitted by the light source and the direction of the scattered light received by the detector is obtained using a mirror having two different curved shapes.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein:

FIGS. 1A-1C show light scattering by particles of increasing diameter;

FIG. 2 shows the general diagram of a known particle detector;

FIG. 3 is a principle diagram of the present particle detector;

FIGS. 4A and 4B are principle operation diagrams of the particle detector of FIG. 3;

FIGS. 7A and 7B show, respectively, an optical diagram regarding the active volume that can be obtained with the detector of FIG. 3, and a graph regarding parameters of the optical diagram of FIG. 7A;

FIGS. 8A and 8B show block diagrams of electronic systems that can be used with the detector of FIG. 3;

FIG. 9 is a perspective lateral view of an embodiment of the present detector;

FIG. 10 is a perspective lateral view of half of the detector of FIG. 9, with parts in section;

FIGS. 11A and 11B are perspective lateral views of two parts of the detector of FIG. 9 in an open condition and with parts removed;

FIG. 12 is a perspective view from beneath of a part of the detector of FIG. 9;

DETAILED DESCRIPTION

Figure 5A:
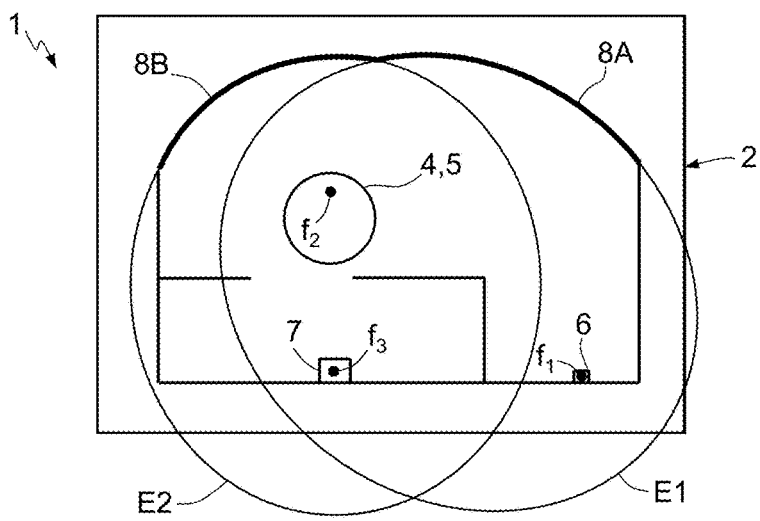
FIG. 5A is a schematic illustration of the arrangement of elliptical surfaces of the detector of FIG. 3.

FIG. 3 shows a principle diagram of a particle detector 1.

The particle detector 1 comprises a body 2 accommodating a chamber 3 and having an inlet opening 4 and an outlet opening 5 (aligned with each other perpendicularly to the drawing plane and thus represented superimposed on each other). The chamber 3 has a vertical wall 60 and accommodates a light source 6 and a photodetector 7 and has a reflecting surface 8.

In detail, the light source 6 and the photodetector 7 are arranged here in a same plane 9, perpendicular to the drawing plane, and are arranged side-by-side. The reflecting surface 8, which is, for example, formed by a metal layer of aluminum, gold, or an interferometric material reflecting only at the wavelength of interest, is formed by two reflecting regions 8A, 8B, facing the light source 6 and the photodetector 7, respectively.

The two reflecting regions 8A and 8B have a curved shape, and, in the illustrated embodiment, are arranged contiguous with each other. In particular, they have the shape of portions of ellipsoid surfaces (thus, in cross section, they have the shape of stretches of ellipse). Alternatively, they could have other curved shapes, such as the shape of portions of paraboloid surfaces or spherical surfaces. According to another alternative, the reflecting regions 8A and 8B have different type shapes from one another.

In the illustrated embodiment, where the reflecting regions have the shape of ellipsoid portions, the light source 6 and the photodetector 7 are arranged at two foci of the ellipsoids, and one of them forms a common focus, as illustrated in FIG. 5A, which represents in a simplified way the shape and arrangement of the structures of the particle detector 1 in a plane.

FIG. 5A shows a first ellipse E1 and a second ellipse E2. The first ellipse E1 has foci f1, f2, and the second ellipse E2 has foci f2, f3. In practice, the focus f2 is common to both of the ellipses E1, E2 and will be referred to hereinafter as "common focus f2". In this figure, the portions of the ellipses E1 and E2 forming the reflecting regions 8A and 8B are represented thickened.

The light source 6 is arranged at the focus f1 of the first ellipse E1, the light beam emitted by the light source 6 is concentrated at the focus f2, and the photodetector 7 is arranged at the focus f3 of the second ellipse E2. In practice, as described in detail hereinafter, f1 represents a radiation-generation focus for the first ellipse E1, f2 represents a concentration focus for the first ellipse E1 and a radiation-generation focus for the second ellipse E2, and f3 represents a concentration focus for the second ellipse E2.

It should be noted that, in the projection of FIG. 3, the common focus f2 is arranged within the area directly between the openings 4, 5 of the body 2; specifically, it is arranged within an active volume of a cylinder having as bases the openings 4, 5, as discussed hereinafter.

In this way, the path of the light illustrated in FIGS. 4A and 4B is obtained. In detail (FIG. 4A), emitted light radiation 10 (light emitted by the light source 6) impinges upon the reflecting region 8A and is reflected towards the common focus f2 (reflected light radiation 11). In presence of a particle P on the common focus f2, the reflected light radiation 11 is scattered in all directions. A part 13 of the scattered light radiation (FIG. 4B) impinges upon the second reflecting region 8B and is reflected towards the photodetector 7 (arranged, as mentioned, at focus f3 of the second ellipse E2), as reflected scattered light radiation 14. The photodetector 7 thus receives a known portion of the emitted light radiation 10, timing whereof (as a concentration measure) and intensity whereof (as particle P size measure) may thus be measured, as discussed hereinafter.

In the detector 1, focusing of the reflected light radiation 11 in f2 where a particle P is expected enables maximization of the intensity of the light coming from the light source 6; the part 13 of the scattered light radiation is in turn focused at the photodetector 7.

In this way, the first reflecting region 8A allows a particle P located at f2 to be hit by a very intense beam, and the second reflecting region 8B allows and increase in the collection efficiency on the photodetector 7, arranged at f3.

To minimize the reflections of the light source within the chamber 3, the latter (except for the reflecting surface 8) may be formed or coated on the inside with anti-reflection material. Alternatively, or in addition, it is possible to provide a light-trapping structure with a high coefficient of optical absorption, where the reflected light radiation 11 hits the walls of the chamber 3 at the end of its useful path.

In FIG. 3, the light-trapping structure is an absorbent structure 12 formed by or on a cantilever wall 18 and by or on at least part of the vertical wall 60 of the chamber 3. In detail, the cantilever wall 18 includes a lateral portion 18' that extends from the vertical wall 60 along a plane above the plane 9 of the photodetector 7, between the photodetector 7 and the common focus f2, along the path of the reflected light radiation 11 in the area where radiation 11 diverges, and beyond the common focus f2 (as discussed with reference to FIG. 5A). The cantilever wall also includes a vertical portion 18" that separates the light source 6 from the photodetector 7. The absorbent structure 12 is formed, for instance, by a coating of absorbent material, e.g., a paint (see http://www.fujifilmusa.com/shared/bin/IGN330_FUJIFILM_INFRARED_ABS_US%20LETTER_LEAFLET_AW.pdf; https://www.epolin.com/nir-absorbing-coatings; https://www.coating-suisse.com/wp-content/uploads/2016/02/CS-IR-CUT_-Coating-agent-solution-001CS.pdf) with high absorption coefficient, for instance higher than 80%, in particular higher than 95%, or by a geometrical structure formed directly by the surface of the cantilever wall 18 and of the vertical wall 60, structured to function as an optical trap, due to a high roughness or of microcavities. The cantilever wall 18 has a hole 19 arranged and of dimensions such as to enable passage of the reflected scattered light radiation 14. In particular, the position and dimensions of the hole 19 may be chosen so as to collect the reflected scattered sunlight 14 coming from the second reflecting region 8B, further reducing the contribution of noise light within the chamber 3.

Obviously, in the schematic representation of FIGS. 3-5A and 6A-6B, the particle detector 1 has been represented according to an ideal model, where, in particular, the reflecting regions 8A, 8B have ideal and coincident focusing points, in particular as regards the common focus f2. In actual fact, the real particle detector 1 may depart from this ideal representation in that the common focus f2 is not generally point-like, and the ellipsoids may have a focus f2 that is not exactly coincident, as discussed below with reference to FIG. 5B.

Figure 6A:
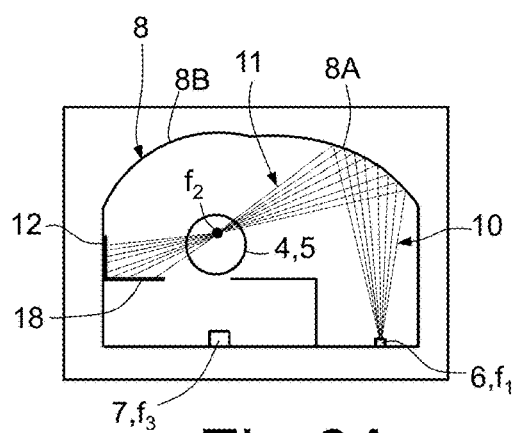
FIGS. 6A and 6B show the light paths in the detector of FIG. 3, in absence and in presence of particles, respectively.
Figure 6B:
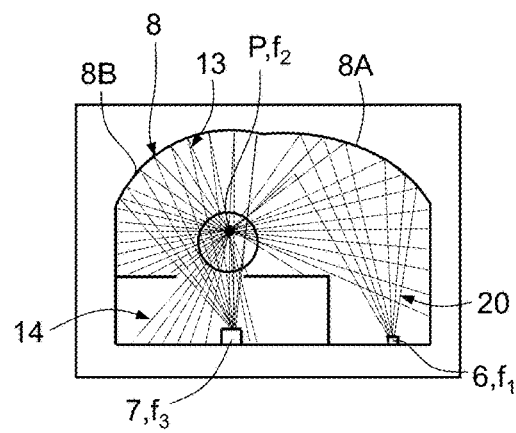

FIGS. 6A and 6B show the results of simulations made by the present Applicant, synthesizing the foregoing. A light source 6 with optical power of 2 mW and beam divergence of 30° was arranged at the first focus f1 of the first ellipse E1. A photodetector 7 sized 400 µm×400 µm was positioned at the second focus f3 of the second ellipse E2. A spherical particle P with a 0.5 µm diameter was arranged at the common focus f2. The inner walls of the chamber 3 were simulated to be black (95% absorption).

FIG. 6A shows the light beam corresponding to the emitted light radiation 10 of FIG. 4A, concentrated in f2 by the first reflecting region 8A of the reflecting surface 8. No particle is present in FIG. 6A, so that the reflected light radiation 11 is not scattered and is absorbed by the cantilever wall 18, which, as mentioned above, is arranged on the path of the reflected light radiation 11, beyond the common focus f2.

FIG. 6B shows the scattering effect by a particle P arranged at the common focus f2. The figure shows the reflected scattered light radiation 14 focused towards the photodetector 7. This figure also shows the part of the scattered light radiation (designated by 13) directed towards the second reflecting region 8B and reflected back by the latter towards the photodetector 7.

In particular, as a result of the geometry illustrated in FIGS. 3-6B, the second reflecting region 8B results in a solid angle for collecting the particle scattered light of approximately 2 sr.

In the simulation, two cases were considered wherein the beam formed by the reflected light radiation 11 focuses in a sphere having a diameter of 300 µm and in a sphere having a diameter of 100 µm. The powers scattered and conveyed on the photodetector 7 by a particle of 0.5 µm were, respectively, approximately 1 nW and 10 nW; the powers scattered and conveyed by a particle P of 10 µm, in the worst confinement case, yielded a power contribution on the photodetector 7 of approximately 400 nW.

The simulations were made assuming the reflected scattered light radiation 14 focused towards the photodetector 7 as coming from the only point corresponding to the common focus f2 where the particle P was located; however, the particle P could be in a point not exactly coinciding with the common focus f2. In fact, the inlet and outlet openings 4, 5 define a region (active volume $V_a$) around the common focus f2, where it is still possible to detect the dispersed particles.

In particular, the active volume $V_a$ is formed approximately by two truncated cones 25 with minor bases accommodating the common focus f2 (FIG. 7A). In simulations made by the present Applicant, as the position of the particle P varies along axis S of the two truncated cones for a reflected light radiation beam 11 focusing in a diameter of approximately 300 µm, an active volume $V_a$ of approximately $5 \cdot 10^{-5}$ cm$^3$ and an overall height H of the two truncated cones 25 of approximately 400 µm are obtained, as illustrated in FIG. 7B. In detail, this figure shows the graph $P_{sc}/P_{0sc}$ as a function of the position of the particle along axis S, where $P_{sc}/P_{0sc}$ is the ratio of the power of the light scattered by a particle P arranged at an increasing distance (in both directions) from the common focus f2 to the light scattered by the same particle P arranged in the common focus f2. The power of the reflected scattered radiation reaching the photodetector 7 decreases rapidly moving away by more than 200 µm from the common focus f2 along axis S.

Obviously, the active volume $V_a$ also depends upon the dimensions of the photodetector 7: the smaller the latter, the less a particle P distant from the common focus f2 scatters light therein.

Figure 5B:
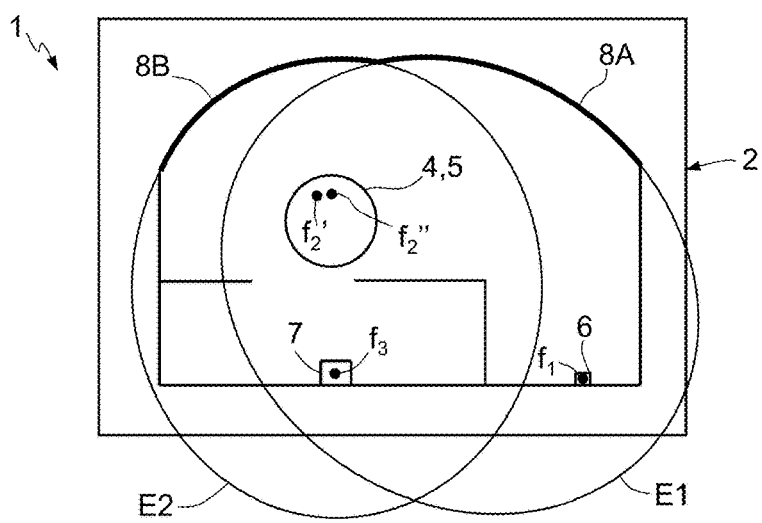
FIG. 5B is a schematic illustration of the arrangement of elliptical surfaces of a non-ideal particle detector.

Considering the foregoing and the possible non-ideal nature of real particle detectors, the first and second ellipses E1, E2 may not have an exactly common focus, but a pair of distinct foci f2', f2", as illustrated in FIG. 5B. In this case, by designing the particle detector 1 so that the foci f2', f2" are in any case close to and comprised within a small concentration volume, concentration of the reflected scattered light radiation 14 on the photodetector 7 is obtained. For instance, the active volume may result from the intersection of the area where the intensity of the light source 6 is still sufficient to produce a useful scattering and the space portion where the light scattered therein can still reach the sensitive portion of the photodetector 7. As particular example, and in an approximate way, with reference to FIGS. 7A and 7B, an acceptable distance between the foci f2' and f2" can be of the order of H/2.

The photodetector 7 may be formed by a photodiode (photoconductive, APD—Avalanche PhotoDiode, SPAD—Single-Photon Avalanche Diode, or SiPM—Silicon Photo-Multiplier) or by an integrated circuit integrating a photodiode or an array of photodiodes and processing and control structures, for detecting the particle concentration, in case measuring the diameters, and controlling the light source 6, as explained with reference to FIG. 8B.

FIG. 8A shows an embodiment of an electronic device 30 able to detect particles in the configuration as single-particle counter (SPC), which enables classification of the particles as to dimensions and counting. In detail, the electronic device 30 comprises, cascade-connected, a detection photodiode 31 (as mentioned, photoconductive, APD, SPAD, or SiPM type); a current-to-voltage conversion stage 32; a high-pass filter 33; a gain-amplifier stage 34; and a pulse-analysis and amplitude-classification stage 35.

In particular, the light emitted by the light source 6, scattered by a particle P travelling in the active volume $V_a$ and detected by the photodetector 7, generates a current signal that is converted into a voltage signal by the current-to-voltage conversion stage 32; the voltage signal is then filtered by the high-pass filter 33 to pass only the transients generated by the passage of the single particles P, limiting the higher frequencies in order to narrow the frequency band and reduce noise. After amplification in the gain-amplifier stage 34, the pulse-analysis and amplitude-classification stage 35 carries out an analysis of the pulse amplitude so as to associate an effective optical dimension to the particle P and, if the forced flowrate of air traversing the system is known, determine the concentration of particles from the number of pulses per unit time. In particular, and in a per se known manner, not described in detail herein, the pulse-analysis and amplitude-classification stage 35 bases its operation upon the temporal spacing of the detected pulses to detect the concentration and upon the signal amplitude as estimate of the size of the particles, for example on the basis of tabulated statistical data. An example of possible implementation is described in the data sheet design "PM2.5/PM10 Particle Sensor Analog Front-End for Air Quality Monitoring Design" TIDUB65C of Texas Instruments.

Alternatively, the pulse-analysis and amplitude-classification stage 35 may determine the duration of the pulses and add up the durations determined during an observation time interval such as to contain many transients. In this case, it derives the concentration value (occupancy time) as the ratio between the above sum duration and the total observation time.

The described processing operations have yielded reliable results, with a small error margin, when the concentration of the particles to be detected is such that, on average, only one particle at a time is present in the active volume $V_a$ and during the statistical sampling interval.

FIG. 8B shows an embodiment of an electronic device 40 able to detect particles using the photometric method.

In detail, the electronic device 40 comprises, cascaded together, the photodetector 7 (also here, photoconductive, APD, SPAD, or SiPM type); a current-to-voltage conversion stage 42; a gain-amplifier stage 44; and a synchronous amplitude-sampling stage 45.

In this case, the light source 6 is preferably controlled for operating in pulsed mode. When the light scattered by a particle P (which is located within the active volume $V_a$) reaches the photodetector 7, the current signal detected by the latter is converted into voltage by the current-to-voltage conversion stage 42. The gain-amplifier stage 44 limits the band and amplifies the output signal of the current-to-voltage conversion stage 42, and the synchronous amplitude-sampling stage 45 carries out synchronous sampling to determine the density of particles also on the basis of additional information stored, such as the diameter distribution of the particles to be detected.

In this case, the electronic device 40 may comprise inside, integrated with the blocks 42-44, a stage for controlling the light source 6 and data input/output stages, for presenting the useful information to the users.

The particle detector 1 is very advantageous for the electrical connections and the component positioning, due to the side-by-side arrangement of the light source 6 and the photodetector 7, in particular when they are arranged in a co-planar position.

Figure 15:
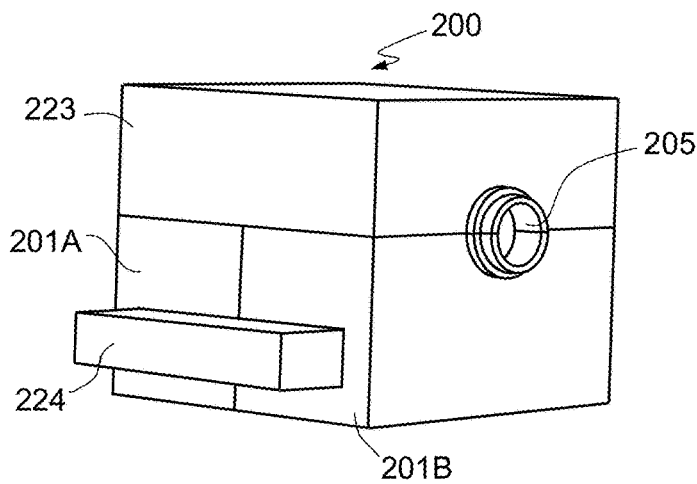
FIG. 15 is a perspective lateral view of the present detector, according to another embodiment.
Figure 16A:
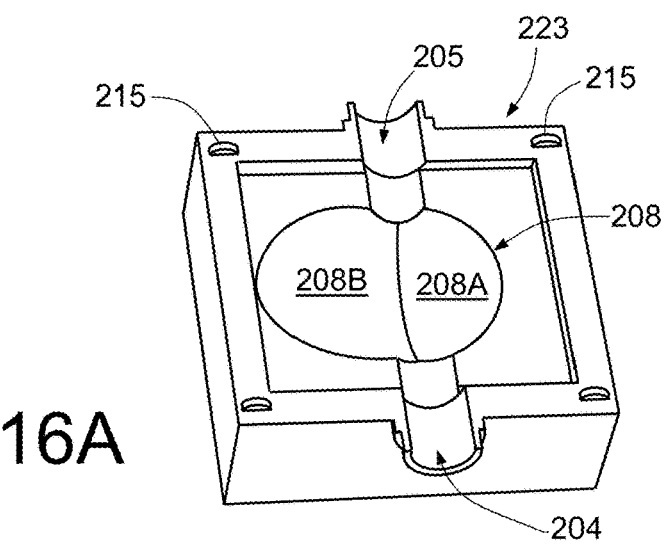
FIGS. 16A, 16B and 16C are, respectively, a view from beneath of a first part, a perspective view from the right of a second part, and a perspective left view of a third part of the detector of FIG. 14.
Figure 16B:
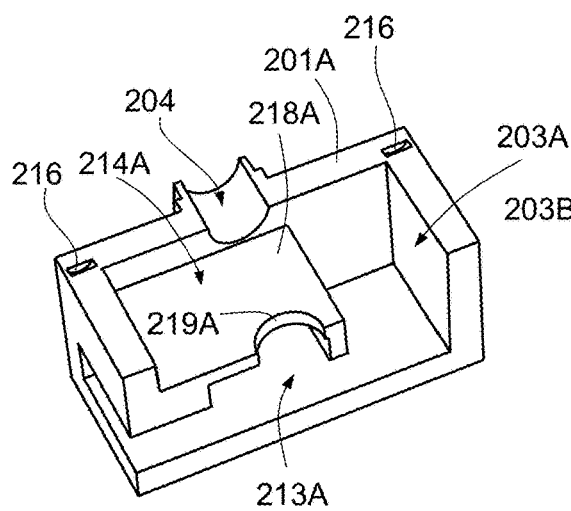
Figure 16C:
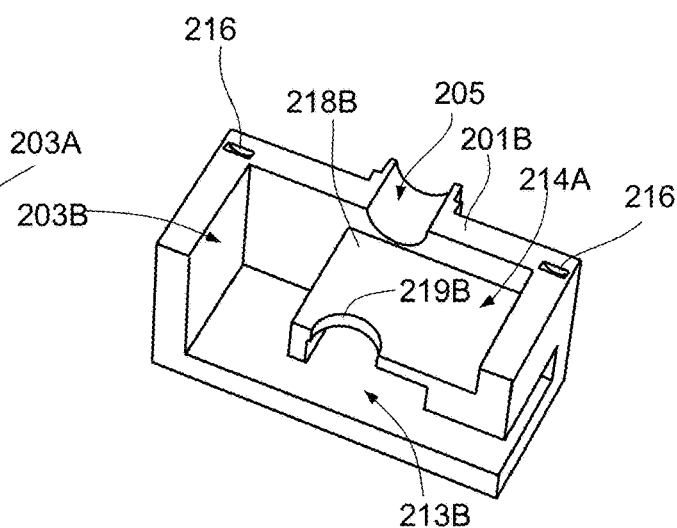

This allows, for example, to arranged the light source 6 and the photodetector 7 on a printed-circuit board (as illustrated, for example, in FIGS. 9 and 15), which contains internal and external electrical connections, in addition to the other components of the device 30 and 40.

The presence of a reflecting surface 8 having two portions 8A, 8B of different shape, in particular two elliptical portions having a common focus (f2), enables efficient focusing of the light radiation 10 emitted by the optical source 6, as well as a high collection efficiency of the reflected scattered light radiation 14 (~2 sr).

As mentioned, the particle detector 1 may operate in SPC mode or on the basis of photometric methods, using, according to the concentrations of particles that are to be detected, the electronic device 30 of FIG. 8A or the electronic device 40 of FIG. 8B. In particular, the electronic device 30 of FIG. 8A enables particle sizes classification in two or more intervals (for example d<2.5 μm and d<10 μm).

The present particle detector has a high saturation value and thus enables determination of the particle concentration per unit volume and dimension classification at much higher concentrations than known (low-cost) commercial SPC solutions for non-professional use, beside of having much smaller dimensions, even twenty times smaller (for example, the embodiments discussed hereinafter may have a width and a height of approximately 1 cm).

FIGS. 9-12 show an embodiment of the particle detector 1, designated by 100, where the parts common to the particle detector 1 are designated by the same reference numbers as in FIG. 3, increased by 100.

In detail, in the particle detector 100 of FIGS. 9-12, the body 102 is formed by two half-shells 101A and 101B, substantially specular, as may be seen from FIGS. 11A and 11B. One of the two half-shells, for example, a first half-shell 101A, has the inlet opening 104, and the other (the second half-shell 101B) has the outlet opening 105 for a gas to be analyzed. The inlet opening 104 and the outlet opening 105 are aligned with each other when the body 102 is closed and may be associated to an air forcing system that is not the subject of the present description. Each half-shell 101A and 101B forms a half-chamber 103 (half-chambers 103A and 103B), a cantilever half-wall 118 (half-walls 118A and 118B), and a half-hole 119 (half-holes 119A and 119B). Moreover, each half-chamber 103A and 103B is formed by a respective first half-cavity 113A, 113B and by a second half-cavity 114A, 114B. The first half-cavities 113A, 113B are shaped so as to house a board 124, for example, a printed-circuit board, which carries the light source 106 and the photodetector 107 (FIG. 10). The second half-cavities 114A, 114B are shaped to house a reflecting body 110 illustrated in FIG. 12 in a view from beneath and forming the reflecting surface 108.

The two half-shells 101A and 101B have mutual restraining means. In the illustrated embodiment, the first half-shell 101A has restraining holes 116, for example truncated cone-shaped, and the second half-shell 101B has corresponding projections 115, which engage together. Other systems for mutual engagement are, however, possible.

The half-shells 101A and 101B may be of plastic material, obtained by 3D printing, and have blackened inner walls, so as to reduce the parasitic light, for example with an absorption coefficient of at least 0.95.

Figure 13:
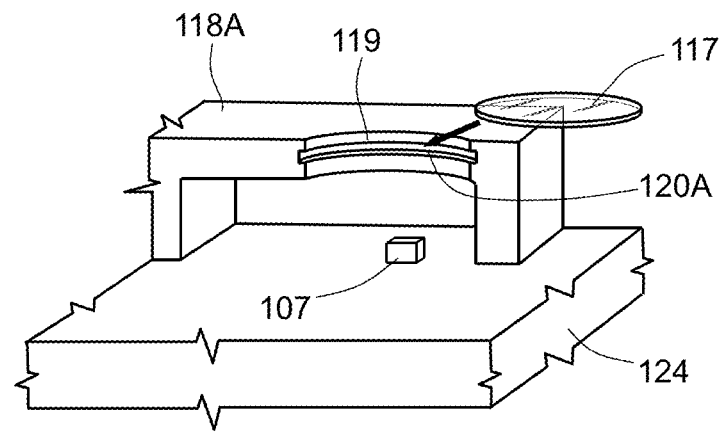
FIG. 13 shows an enlarged detail of the part of the casing of FIG. 9 according to a different embodiment.

FIG. 13 shows a variant of a portion of the particle detector 100. Here, a plate 117 of glass (or other material transparent to the scattered light wavelength) may be arranged above the photodetector 107 to protect it from possible obstructions, due to deposition of particles, and block any possible residual external visible light. The plate 117 may be blocked in a pair of grooves formed in the cantilever half-walls 118A, 118B (in the figure just one groove 120A formed in the first half-shell 101A is visible).

Figure 14:
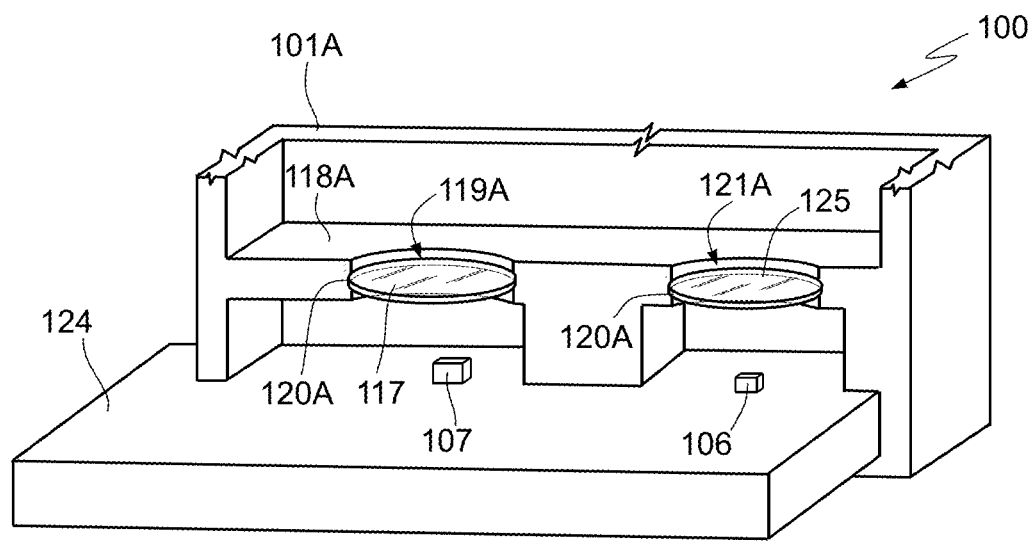
FIG. 14 shows an enlarged detail of the part of the casing of FIG. 9 according to another embodiment.

FIG. 14 shows another variant of a portion of the particle detector 100, which comprises, in addition to the plate 117 of FIG. 13 (here referred to as "first plate 117"), a second plate 125 arranged above the light source 107. In this case, the cantilever half-walls 118A, 118B are prolonged so as to extend throughout the length and width of the body 102 and form a second half-hole and a further pair of grooves, whereof only the second half-hole 121A and the second half-groove 122A are illustrated.

FIGS. 15 and 16A-16C show another embodiment for the particle detector 1, designated by 200.

In detail, in the particle detector 200 of FIGS. 15, 16A-16C, the body 202 is formed by two half-shells 201A and 201B and by a lid 223. The two half-shells 201A and 201B basically correspond to the bottom portions of the half-shells 101A and 101B of FIGS. 9-11 and form the bottom halves of the inlet opening 204 and of the outlet opening 205, cantilever half-walls 218A and 218B, and half-holes 219A and 219B.

The two half-shells 201A and 201B moreover form respective half-chambers 203A, 203B closed at the top by the lid 223 and formed by respective first half-cavities 213A, 213B and by respective second half-cavities 214A and 214B. The first half-cavities house a board 224 (FIG. 15) similar to the board 124 of FIG. 10, and the second half-cavities 214A and 214B define the space traversed by particles P between the inlet opening 204 and the outlet opening 205. The lid 223 is shaped inside so as to directly form the reflecting surface 208, also here made up of a first reflecting region 208A and a second reflecting region 208B, each having the shape of an ellipsoidal surface portion. Also here, the reflecting regions 208A and 208B have respective foci f1, f2, f3, arranged as discussed above.

The body 202 is provided with mutual-restraining means, here formed by projections 215, for example shaped as half-moon tabs on the lid 223, and by corresponding blocking holes 216 in the half-shells 201A, 201B, which fit together. Also here, however, other systems for mutual engagement are possible.

The two half-shells 201A and 201B are, for example, of plastic material, manufactured by 3D printing. The lid 223 is also obtained by 3D printing of plastic material so as to have the desired ellipsoid shape. The bottom surface of the lid 223 may be coated, for example by electroplating, so as to cause it to be reflecting. Also in this case, the inner walls of the two half-shells 201A and 201B may be blackened so as to have a high absorption coefficient.

As an alternative to what is illustrated, the cantilever half-walls 218A and 218B may be manufactured separately from the half-shells 201A and 201B, for example using a perforated MEMS cap, glued above the photodetector 207 and possibly above the light source 206.

Also in the embodiment of FIGS. 15, 16A-16C it is possible to insert a transparent plate in the hole formed by the half-holes 219A and 219B. Moreover, the cantilever half-walls 218A, 218B may be prolonged and form a second hole for a second plate, as illustrated in FIG. 14.

Finally, it is clear that modifications and variations may be made to the particle detector described and illustrated herein, without thereby departing from the scope of the present disclosure. For instance, the various embodiments described may be combined so as to provide further solutions.

For instance, as mentioned, the shape of the reflecting regions 8a, 8B, 108A, 108B, 208A, 208B may be different from the illustrated one; in particular, they may be formed by paraboloidal or spherical surface portions, even though the illustrated ellipsoidal shape ensures maximum efficiency. In this case, albeit losing part of the focusing capacity and working "off axis", it is possible to have an optical operation similar to an ellipse, as described in: https://www.olympus-lifescience.com/en/microscope-resource/primer/lightand-color/mirrorsintro/, arranging the light source 6 and the photodetector 7 in mating positions.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A particle detector, comprising:
a body including a chamber having a first surface and a second surface transverse to the first surface;
a light source within the chamber and on the first surface;
a photodetector in the chamber and on the first surface, the photodetector closer to the second surface than the light source;
a reflecting surface including a first reflecting region and a second reflecting region, which have a respective curved shape, the first and second reflecting regions facing, respectively, the light source and the photodetector; and
a cantilever wall having a first end on the second surface and a second end between the photodetector and the light source, the cantilever wall having a hole aligned with the photodetector.

2. The particle detector according to claim 1, wherein the first reflecting region and the second reflecting region are shaped as surface portions of the group consisting of ellipsoids, paraboloids, and spheres.

3. The particle detector according to claim 1, wherein the first reflecting region has a first focus and the second reflecting region has a first focus, the first focus of the first reflecting region being arranged in an active volume of the chamber for detecting particles, and the photodetector being arranged on the first focus of the second reflecting region.

4. The particle detector according to claim 3, wherein the reflecting regions are shaped as ellipsoid portions each having a second focus, the second focus of the second reflecting region being comprised in the active volume of the chamber and defining a common focus with the first focus of the first reflecting region, and the photodetector being arranged on the second focus of the first reflecting region.

5. The particle detector according to claim 4, wherein the body has an inlet opening and an outlet opening arranged mutually aligned and delimiting the active volume within the chamber between the inlet opening and the outlet opening.

6. The particle detector according to claim 4, wherein the body comprises a light-trap structure, configured to absorb radiation emitted by the light source and is arranged on an opposite side of the common focus with respect to the first reflecting region.

7. The particle detector according to claim 6, cantilever wall arranged between the second reflecting region and the photodetector and having the hole for light passage from the second reflecting region to the photodetector.

8. The particle detector according to claim 7, wherein the light-trap structure includes at least one of a light-absorbent paint on the cantilever wall, the light-absorbent paint having an absorption coefficient greater than 80%, or a geometrical structure with a high roughness surface.

9. The particle detector according to claim 7, comprising a first lens arranged in the hole of the cantilever wall.

10. The particle detector according to claim 9, further comprising a second lens arranged between the light source and the first curved portion.

11. The particle detector according to claim 1, wherein the chamber has inner walls having light absorption structures.

12. The particle detector according to claim 1, wherein the light source and the photodetector are arranged in a same plane.

13. The particle detector according to claim 1, wherein the light source is a laser device and the photodetector comprises a photodiode.

14. The particle detector according to claim 1, wherein the body comprises a pair of half-shells each having a first half-cavity and a second half-cavity, the first cavities forming a first cavity, the second half-cavities forming a second cavity, the first cavity housing a board carrying the light source and the photodetector, and the second cavity including the chamber and housing a mirror element, which includes the reflecting surface.

15. The particle detector according to claim 1, wherein the body comprises a pair of half-shells and a lid, each half-shell having a first half-cavity and a second half-cavity, the first half-cavities forming a first cavity, the second half-cavities forming a second cavity, the first cavity housing a board carrying the light source and the photodetector wherein the lid closes a top of the second cavity and forms the reflecting surface.

16. The particle detector according to claim 15, wherein the pair of half-shells has mutual-restraining elements.

17. A method, comprising:
operating a particle detector having a chamber defining an active volume and housing a light source, housing a reflecting surface, housing a photodetector, and housing a cantilever arm overlying the photodetector and having a hole aligned with the photodetector, the reflecting surface having a first curved portion and a second curved portion that have respective radiation-concentration foci, the operating including:
letting a flow of air including a particle through the active volume of the chamber;
generating, by the light source, an emitted light beam directed towards the first curved portion;
generating, by the first curved portion, a reflected light beam concentrated in the radiation-concentration focus of the first curved portion within the active volume;
generating, by the particle, a scattered radiation;
collecting a part of the scattered radiation by the second curved portion by passing the part of the scattered radiation through the hole in the cantilever wall; and
generating, by the second curved portion, a reflected scattered light beam concentrated in the radiation-concentration focus of the second curved portion towards the photodetector.

18. The method according to claim 17, wherein the first curved portion and the second curved portion are respective ellipsoidal surfaces that have a respective radiation-generation focus, and wherein the light source is arranged at the radiation-generation focus of the first curved portion, and the radiation-generation focus of the second curved portion is within the active volume.

19. A particle detector, comprising:
an internal chamber having a first wall and a second wall opposite to the first wall;
a reflecting body having a reflecting surface in the internal chamber, the reflecting surface including:
a first end at which the reflecting surface terminates;
a second end opposite to the first end at which the reflecting surface terminates;
a middle region between the first end and the second end;
a first reflecting region having a first curved shape, the first reflecting region extending from the first end to the middle region, the first reflecting region being concave from the first end to the middle region; and
a second reflecting region having a second curved shape different from the first curved shape, the second reflecting region extending from the second end to the middle region, the second reflecting region abuts the first reflecting region at the middle region, the second reflecting region being concave from the second end to the middle region;
a light source within the internal chamber; and
a photodetector within the internal chamber.

20. The particle detector according to claim 19, wherein the first and second curved shapes of the first and second reflecting regions, respectively, are shaped as portions of first and second ellipsoids, respectively, the first ellipsoid having a first focus at the photodetector and a second focus in an active volume of the internal chamber, and the second ellipsoid having a first focus at the photodetector and a second focus in the active volume and substantially at the second focus of the first ellipsoid.

21. The particle detector of claim 19, further comprising:
a first sidewall of the internal chamber;
a second sidewall of the internal chamber opposite to the first sidewall;
a cantilever wall in the internal chamber, the cantilever wall extending from the first sidewall toward the second sidewall, the cantilever wall overlying the photodetector, and the cantilever wall including:
a hole aligned with the photodetector; and
an end between the photodetector and the light source.

* * * * *